(12) United States Patent
Vestergaard et al.

(10) Patent No.: US 12,352,478 B2
(45) Date of Patent: Jul. 8, 2025

(54) SENSING OF A VAPOR QUALITY

(71) Applicant: Danfoss A/S, Nordborg (DK)

(72) Inventors: Niels P. Vestergaard, Nordborg (DK); Johan Van Beek, Nordborg (DK)

(73) Assignee: DANFOSS A/S, Nordborg (DK)

( * ) Notice: Subject to any disclaimer, the term of this patent is extended or adjusted under 35 U.S.C. 154(b) by 521 days.

(21) Appl. No.: 17/297,640

(22) PCT Filed: Nov. 25, 2019

(86) PCT No.: PCT/EP2019/082381
§ 371 (c)(1),
(2) Date: May 27, 2021

(87) PCT Pub. No.: WO2020/109214
PCT Pub. Date: Jun. 4, 2020

(65) Prior Publication Data
US 2022/0018793 A1 Jan. 20, 2022

(30) Foreign Application Priority Data
Nov. 29, 2018 (EP) ..................................... 18209032

(51) Int. Cl.
*F25B 41/34* (2021.01)
*F25B 49/02* (2006.01)
*G01N 25/08* (2006.01)

(52) U.S. Cl.
CPC .............. *F25B 41/34* (2021.01); *F25B 49/02* (2013.01); *G01N 25/08* (2013.01)

(58) Field of Classification Search
CPC ...... G01K 1/143; G01K 13/02; G01K 17/025; G01K 3/08; G01N 25/18; G05D 23/30; G05D 23/303; F25B 2341/0681
See application file for complete search history.

(56) References Cited

U.S. PATENT DOCUMENTS

| | | | |
|---|---|---|---|
| 3,735,603 | A | 5/1973 | Hamilton |
| 4,123,919 | A | 11/1978 | Fehlhaber |
| (Continued) | | | |

FOREIGN PATENT DOCUMENTS

| | | |
|---|---|---|
| CA | 2862159 C | 7/2012 |
| CN | 101124436 A | 2/2008 |
| (Continued) | | |

OTHER PUBLICATIONS

First Examination Report for Indian Patent Application No. 202117011391 dated Aug. 9, 2021.
(Continued)

*Primary Examiner* — Schyler S Sanks
(74) *Attorney, Agent, or Firm* — McCormick, Paulding & Huber PLLC

(57) ABSTRACT

The invention relates to a sensor arrangement for providing a sensor signal S indicative of a vapor quality X of a medium flowing within a conduit 38a. A sensor includes a heating element and a temperature sensing element is arranged in thermal contact with a wall of a horizontally arranged portion 38a of the conduit 34. Processing means are disposed to deliver a sensor signal S based on an output of the temperature sensing element 52. The sensor 40 includes a sensor body 46 made of a metal material. The heating element 48 and the temperature sensing element 52 are arranged in thermal contact with the sensor body 46. The invention further relates to a cooling system 10 including at least one evaporator 32 for evaporating an ammonia refrigerant, at least one compressor 12 arranged to compress the evaporated refrigerant, and at least one condenser 18 for condensing the compressed refrigerant, and at least one evaporator pump 30 for pumping the condensed refrigerant to the evaporator 32. A sensor arrangement 50 is arranged at
(Continued)

a conduit 34 conducting the refrigerant from at least a portion of the evaporator 32.

20 Claims, 9 Drawing Sheets

(56) References Cited

U.S. PATENT DOCUMENTS

| | | | |
|---|---|---|---|
| 4,167,858 A | | 9/1979 | Kojima et al. |
| 4,586,828 A | * | 5/1986 | Winter .................. G01K 1/143 374/E1.019 |
| 4,835,976 A | | 6/1989 | Torrence |
| 5,195,331 A | | 3/1993 | Zimmern et al. |
| 5,289,692 A | | 3/1994 | Campbell et al. |
| 5,454,641 A | * | 10/1995 | Parker ..................... G01K 1/20 374/E1.019 |
| 5,495,720 A | | 3/1996 | Buck |
| 5,691,466 A | | 11/1997 | Lawrence et al. |
| 6,079,220 A | | 6/2000 | Buck |
| 8,646,286 B2 | | 2/2014 | Scherer et al. |
| 9,874,385 B2 | | 1/2018 | Izadi-Zamanabadi et al. |
| 2006/0090490 A1 | | 5/2006 | Grimm et al. |
| 2006/0165154 A1 | | 7/2006 | Usui |
| 2010/0162810 A1 | | 7/2010 | Hasebe |
| 2011/0209494 A1 | | 9/2011 | Nelson |
| 2013/0086930 A1 | * | 4/2013 | Scherer ..................... F25B 1/00 62/216 |
| 2015/0226472 A1 | | 8/2015 | Scherer |
| 2016/0178243 A1 | | 6/2016 | Derosier |
| 2016/0178257 A1 | | 6/2016 | Liebendorfer et al. |

FOREIGN PATENT DOCUMENTS

| | | |
|---|---|---|
| CN | 203097835 U | 7/2013 |
| CN | 107257923 A | 10/2017 |
| DE | 1055018 B | 4/1959 |
| DE | 3934801 A1 | 4/1991 |
| DE | 4115693 A1 | 11/1992 |
| EP | 0680589 B1 | 1/1999 |
| EP | 1744113 A1 | 1/2007 |
| GB | 2157447 A | 10/1985 |
| GB | 8509184 A | 10/1985 |
| JP | 5878050 A | 5/1983 |

OTHER PUBLICATIONS

International Search Report for Application No. PCT/EP2019/082381 dated Feb. 20, 2020.

International Search Report for Application No. PCT/EP2019/082380 dated Feb. 20, 2020.

\* cited by examiner

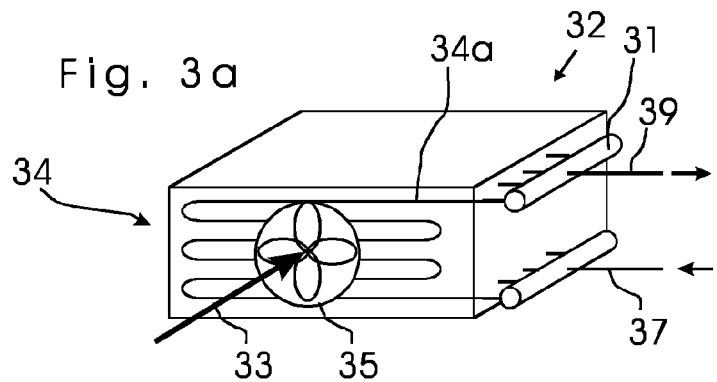
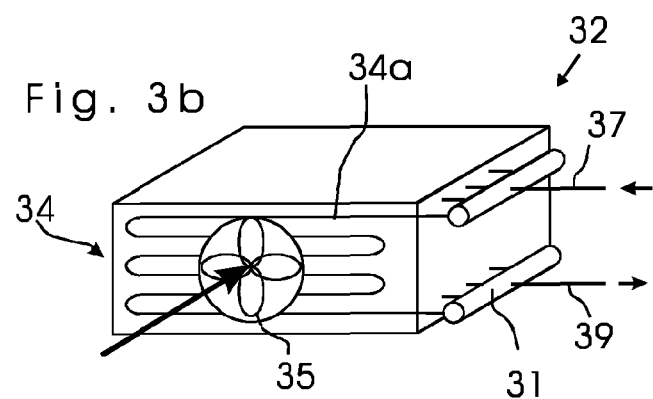
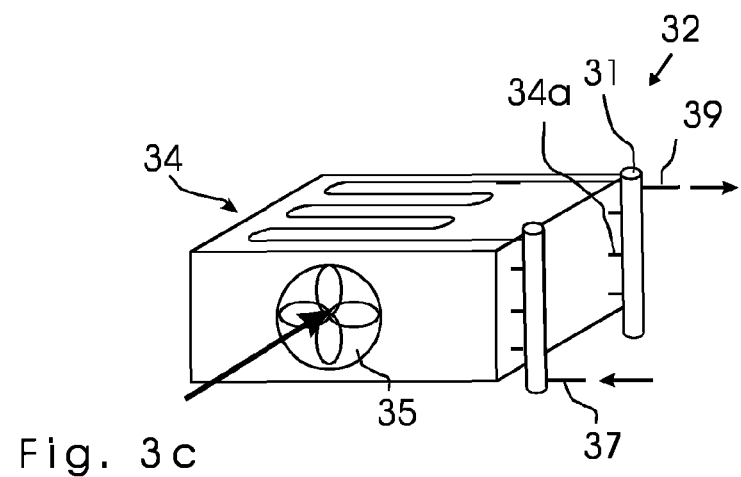

SENSING OF A VAPOR QUALITY

CROSS-REFERENCE TO RELATED APPLICATIONS

This application is a National Stage application of International Patent Application No. PCT/EP2019/082381, filed on Nov. 25, 2019, which claims priority to European Patent Application No. 18209032.4 filed on Nov. 29, 2018, each of which is hereby incorporated by reference in its entirety.

TECHNICAL FIELD

The invention relates to a sensor arrangement for providing a sensor signal indicative of a vapor quality of a medium flowing within a conduit, to a cooling system including such a sensor arrangement, and to a method of sensing a vapor quality.

BACKGROUND

In a saturated vapor/liquid two-phase flow of a medium, the vapor quality is a value representing the mass fraction of the medium that is vapor (gas). The terms "gas" and "vapor" are herein used interchangeably to denote the refrigerant in its gaseous state. If the flow consists of only saturated vapor, the vapor quality value is 100%. If the flow consists of only saturated liquid, the vapor quality value is 0%.

For many applications, in particular for control of a cooling system, it can be advantageous to obtain a measurement value that is at least to some degree indicative of the vapor quality of a medium flowing through a conduit.

In "Use of Pulse Width modulated Valves in industrial Refrigeration" by L. M. Jessen, presented at IIAR 19$^{th}$ Annual Meeting, Mar. 23-26, 1997, New Orleans, automatic control of refrigerant injection into an air unit on a liquid overfeed pump recirculation system is described. A heated temperature sensor on the air cooler, an air temperature sensor and a pressure transmitter are used as inputs to an electronic controller. The controller continually manages the modulation of the pulse width modulated valve that injects refrigerant into the air unit. To ensure that the circulation ratio is higher than one, the heated temperature sensor is placed on the outlet of the pipe circuit with the highest heat load, for instance the pipe circuit in the incoming air stream on an evaporator with horizontal air flow and vertical refrigerant flow. When liquid is in the pipe, heat from the sensor is removed through refrigerant evaporation. If no liquid is in the pipe, the pipe temperature rises. The controller principle is based on gradual opening of the injection valve while the sensor detects temperatures higher than the saturation temperature.

GB 2157447A discloses a heat exchange equipment such as a refrigerator. A compressor conveys gaseous refrigerant through a pressure conduit into a condenser. The liquefied refrigerant arrives through an expansion valve in an evaporator. A suction conduit leading back to the compressor is connected to the outlet of the evaporator. A measuring device detects whether the suction conduit contains dry refrigerant or whether the refrigerant still has liquid components and what degree of moisture. The measuring device acts on a switching device serving to control the expansion valve. As soon as the refrigerant flowing through the suction conduit contains liquid, the expansion valve closes until there is dry refrigerant again. The expansion valve may also be controlled by the degree of moisture present in the refrigerant.

DE 1055018 discloses a method for regulating a refrigeration machine in which the refrigerant enters an evaporator in a liquid state and the liquid level in the evaporator is subject to change depending on load. At the exit of the evaporator, the mass ratio of liquid and vapor phase of the refrigerant is measured and the amount of refrigerant entering the evaporator is adjusted in accordance with the measured ratio. The refrigerant flows through a pipe made of a material with high heat conduction resistance, such as a plastic material. A heating element is arranged between a temperature sensor and the wall of the pipe. Heating is effected with constant heating power and the temperature is measured.

U.S. Pat. No. 4,123,919 discloses a refrigeration feed system including an accumulator adapted to contain liquid in its lower portion and to contain gas in its upper portion. A plurality of individual evaporators are arranged each at a different elevation above the accumulator. Refrigerant gas from the accumulator flows through the pipe, is compressed in the compressor and is discharged in compressed form through a duct leading into a condenser. Therein the compressed gas is cooled and liquefied. The liquefied refrigerant flows through a pressure reducer and then travels through a duct into the bottom of the accumulator to join a body of liquid refrigerant therein. A pump withdraws liquid from the lower portion of the accumulator and pumps the liquid through a supply manifold to each one of the evaporators.

SUMMARY

It may be considered an object to propose a sensor arrangement, a cooling system, and a sensing method suited to obtain information about the mass fraction of different phase components in a gas/liquid mixture flowing within a conduit which are reliable and simple to install.

This object is addressed by a sensor arrangement according to claim 1, a cooling system according to claim 8, and by a method according to claim 13. Dependent claims refer to preferred embodiments of the invention.

The sensor arrangement according to the invention comprises a sensor arranged in thermal contact with a wall of a conduit, e.g. a pipe or tube. A medium is flowing through the conduit. The medium will generally be a of a known composition and considered to contain unknown quantities of liquid and gas phase, i.e. an unknown vapor quality. The vapor quality X is the mass fraction of gas in a saturated gas/liquid phase mixture; saturated vapor has a vapor quality value X of 100% and saturated liquid has a vapor quality value X of 0%.

As will become apparent, the medium may in particular be an at least partly evaporated refrigerant in a cooling system. The invention is particularly suited to the medium being ammonia.

The sensor comprises a heating element and a temperature sensing element. The heating element is provided to supply heat and may in particular be an electrical heating element, such as e.g. an Ohmic heating element of known resistance. An operating element, such as an electrical driver circuit may be provided to supply heating power to the heating element.

The temperature sensing element may be of any type, preferably to supply an electrical signal indicative of the temperature or of a temperature change. In particular, the temperature sensing element may e.g. be a thermocouple or resistance temperature detector (RTD), such as for example a Pt100 element.

The heating element and the temperature sensing element are thermally coupled to a wall of the conduit. While the conduit wall may be of any material allowing a certain amount of heat conduction, a metal material is preferred, in particular copper and/or aluminum.

The thermal coupling of the heating element, temperature sensing element and adjoining conduit wall is preferably very close, such that they assume the same temperature with no or only minimal temperature gradient.

The sensor may be referred to as a heated temperature sensor. The underlying sensor principle is based on absorption of heat by the medium within the conduit. The medium is in thermal contact with the inner conduit wall and in case of a temperature difference thereto will absorb heat therefrom. The rate of absorption of heat will differ, depending, besides the temperature difference, on the phase of the medium in direct contact with the inner conduit wall. If a substantial amount of liquid medium is in contact with the inner wall, heat will be absorbed by the medium at a high rate, whereas if the inner wall is "dry", i.e. only in contact with gas, the heat absorption rate will be low. Thus, the heat absorption will vary depending on the vapor quality X of the medium.

Preferably, the heating element may be disposed and/or operated to deliver a constant amount of heat. As heat is supplied from the heating element at a constant rate and conducted through the conduit wall, an equilibrium temperature will be established, which will vary depending on the rate of absorption of heat by the medium and therefore on the vapor quality X thereof.

Processing means are provided, disposed to deliver a sensor signal based on an output of the temperature sensing element. The sensor signal may be delivered in any form, e.g. as a digital or as an analogue electrical signal, in particular a voltage signal or current signal.

The processing means may be provided within the sensor, close to the sensor or remote therefrom. They are connected to receive the output of the temperature sensing element, e.g. from a direct electrical connection or any other type of signal transmission.

The processing means preferably comprise an electrical circuit and may comprise a microprocessor or microcontroller programmed to process the output of the temperature sensing element to deliver the sensor signal. Processing of the output may comprise any type of signal processing including processing steps which comprise further input such as additional signals or data. For example, the sensor signal may directly reflect the output of the temperature sensing element. In a preferred embodiment, the sensor signal may be derived by calculating a difference between the output and a reference value, such as e.g. a reference temperature, which may be the saturated temperature of the medium within the conduit.

While the conduit portion to which the sensor is mounted may in principle have any shape in cross-section, a circular cross-section is preferred.

The sensor is provided at a horizontally arranged portion of the conduit. As will be explained in more detail with respect to exemplary embodiments, the orientation of a conduit has a significant influence on the spatial distribution of the liquid and gas constituents of the medium. The liquid constituents will tend to assemble in a bottom portion of the conduit. This known inhomogeneity may be exploited for choosing a desired sensor sensitivity by a corresponding placement of the sensor on the wall of the conduit. For example, the sensor may be arranged on top of the conduit, i.e. in contact with a top portion of the conduit wall. As explained, a substantial amount of liquid in direct contact with an inner conduit wall will lead to a high heat absorption and may entail no or only minimal variation of the temperature sensor output, even if the total vapor quality of the medium in the conduit varies. If the sensor is arranged on top, e.g. in a position forming an angle of 30° or less to the upward vertical direction, preferably 20° or less, further preferred 10° or less, the amount of liquid at the inner conduit wall will be at a minimum and the sensor arrangement will have a high sensitivity even for lower values of the vapor quality.

On the other hand, a different sensitivity may be preferred. For example, the sensor may be arranged in an at least substantially horizontal position, e.g. under an angle of 45°-135° to the upward vertical direction, preferably 70°-110°, in particular 90°+/−10°. This will lead to less sensitivity for lower values of the vapor quality.

Also, if even less sensitivity is desired, the sensor may alternatively be arranged at least substantially in a bottom position, e.g. under an angle of more than 135° to the upward vertical direction, preferably more than 150°, in particular 170° or more.

Thus, the sensor arrangement is suited to provide a sensor signal indicative of the vapor quality of a gas and/or liquid flowing within the conduit. The sensor may be mounted to the outside of the conduit, such that it may be easily installed e.g. to existing tubing without necessity of opening the conduit. Due to the horizontal arrangement of the conduit portion to which the sensor is mounted, a desired sensitivity may be chosen.

The sensor signal delivered is indicative of the vapor quality, which should be understood such that an information about a vapor quality value may be gained from the sensor signal. This may include that the vapor quality value X may be calculated or otherwise deducted based on the sensor signal S, as well as possibly further parameters. However, it may be sufficient for the sensor signal being indicative of the vapor quality if there is a determinable dependency of the sensor signal on the vapor quality value X, or vice versa. For example, the sensor signal may indicate a change amount and/or change direction of the vapor quality value X, i.e. if it increases or decreases. Preferably, the sensor signal may have a strictly monotonous dependency on the vapor quality X. As will become apparent in connection with preferred embodiments, it may not be necessary to actually obtain specific vapor quality values from the sensor signal to deduct information about the medium, or to effect control based on the state of the medium.

According to the invention, the sensor comprises a sensor body made of a metal material. The heating element and the temperature sensing element are arranged in thermal contact with the sensor body. By providing a sensor body, particularly preferred a massive piece of metal, preferably of copper, aluminum or other metal of very good heat conduction, the thermal coupling of the temperature sensing element, heating element and conduit wall is improved. In a particularly preferred embodiment, the heating element and/or the temperature sensing element may be arranged in one or more cavity formed within the sensor body. The heating element and/or temperature sensing element may be surrounded by the material of the sensor body, thus providing good thermal coupling.

The sensor may be mounted to the conduit wall in different ways, e.g. preferably by clamping, i.e. mechanically urging the sensor into direct contact with the conduit wall. In order to obtain good coupling, the sensor may comprise a contact portion shaped to conform to the outer shape of the conduit wall. In particular, the sensor may comprise a concave portion, and the conduit wall may be at least partially received within the concave portion. It is possible for the sensor to comprise multiple concave portions of different shape, such as e.g. different curvature, to conform to different shapes of conduits, e.g. different outer tube diameters.

In a preferred embodiment, the sensor arrangement may comprise an insulating element. The insulating element may be arranged to cover at least said sensor and a part of the conduit. Such an insulating element may reduce external influences on the measurement, such as by ambient temperature.

While it is possible for the sensor and/or a sensor body thereof to contact the conduit over a large portion of its circumference, and the sensor/sensor body may even entirely surround the conduit, it may be preferred to arrange the sensor in contact with the conduit wall over a contact angle of less than 90°, preferably 45° or less. As explained above, this allows to more accurately choose a desired sensitivity.

The sensor may be operated in different ways. While it is preferred to supply a constant amount of heat over time, the heating element may also be operated e.g. by supplying heat bursts such that a change of the resulting output of the temperature sensing element may be observed. Also, the sensor may be operated at different temperature and/or power levels. In a preferred embodiment, the heating element may be disposed and/or operated to provide an amount of heat such that a value of heat divided by a contact area between the sensor and the conduit wall is less than or equal to $0.2$ $W/mm^2$.

The device and method according to the invention delivering a sensor signal indicative of the vapor quality may be used e.g. in a cooling system, in particular with ammonia as refrigerant. The cooling system may comprise at least one evaporator for evaporating the ammonia refrigerant, at least one compressor to compress the ammonia refrigerant, and at least one condenser for condensing the compressed refrigerant. The described sensor arrangement may be provided at a conduit conducting at least partly evaporated refrigerant from the evaporator, e.g. to the compressor and/or to a receiver or accumulator. The term "at least a portion" includes that the sensor may be mounted e.g. within the evaporator, such as on a portion of an evaporator tube. Alternatively, the sensor may be arranged at a return line conducting at least partly evaporated refrigerant away from the evaporator.

In the evaporator, the refrigerant will traverse evaporator pipes having at least a first portion exposed to an air flow. The sensor may be arranged on one of the evaporator pipes. While it is possible in principle to arrange the sensor on one of the evaporator pipes in a position within the first portion exposed to the air flow, it is preferably arranged at a second portion thereof located outside of the air flow.

In an evaporator with multiple evaporator pipes, which are e.g. arranged in parallel to each other, the thermal load of the individual evaporator pipes will generally differ, e.g. as a consequence of their arrangement relative to an air flow. At least one of the evaporator pipes will have the highest thermal load throughout the evaporator. Examples of a suitable definition of the highest loaded pipe as well as its determination will be further discussed below. It may be preferred to arrange the sensor on this evaporator pipe, as a high vapor quality value X of the medium therein may be expected. In particular, the sensor may preferably be arranged at or near an outlet of an evaporator pipe.

In one embodiment, a position for a placement of the vapor quality sensor may be found by experimentally determining among several evaporator pipes of an evaporator the one evaporator pipe with the highest thermal load. In the proposed experimental determination, the vapor quality in one or more of the evaporator pipes may be monitored as a cooling system is operated in a particular manner. The cooling system may e.g. be operated starting from an operation point at which the vapor quality of all evaporator pipes of the evaporator is below 100%. The mass flow to an evaporator may then be reduced, which generally will lead to an increase of the vapor quality in the outlets of each of the parallel evaporator pipes. The one evaporator pipe 34 which first reaches a vapor quality value of $X \geq 100\%$ is determined to be the highest loaded pipe. The sensor may preferably be arranged on the thus determined highest loaded pipe to ensure operation at a vapor quality of less than 100% throughout the evaporator.

Using the sensor arrangement and method on ammonia refrigerant after it has traversed at least a part of the evaporator allows to gather information about operation of the cooling system.

In particular, the sensor signal may be used for controlling elements of the cooling system. In one embodiment, the cooling system may comprise a controllable evaporator inlet valve connected to an inlet of the evaporator. The degree of opening of the evaporator inlet valve may be controllable to control the flow of refrigerant through the valve, which may be e.g. a solenoid or motor controlled valve. Controller means may be provided, disposed to control the evaporator inlet valve depending on the sensor signal.

As will be explained in more detail below, controlling an ammonia cooling system based on the sensor signal, and in particular controlling the evaporator inlet valve in this way, may allow optimized operation, which can help to reduce the amount of ammonia refrigerant and/or to improve efficiency.

It is particularly preferred to provide the controller configured to reduce an opening of the evaporator inlet valve in response to a sensor signal indicative of a lower vapor quality value, and to increase an opening of the evaporator inlet valve in response to a sensor signal indicative of a higher vapor quality value. The higher and lower vapor quality values may e.g. be determined relative to one or more reference values, threshold values or to a predetermined setpoint. Control may be based e.g. on an operating point with a reference setting of the evaporator inlet valve opening and/or a reference sensor signal level. If the sensor signal deviates from the reference sensor signal, the inlet valve opening may be adjusted in accordance with the control strategy. The controller may employ any suitable control strategy, such as e.g. proportional control, integral control, and/or derivative control. Preferred may be a PID controller.

The cooling system may be of any type. In particular, the cooling system may preferably be a pump overfeed system in a pump overfeed system, the evaporator is operated such that the refrigerant is evaporated only partly, i.e. the refrigerant in a return conduit still has a substantial amount of liquid. The vapor quality determined by the device will thus be below 100%, preferably 95% or lower, further preferred 90% or lower, particularly preferred 85% or lower. A circulation rate, defined as the ratio of the mass flow of refrigerant supplied to an evaporator and the rated/nominal capacity of the evaporator, will be above 1. Generally, the circulation rate N and the vapor quality value X at the outlet of the evaporator are related in that X=1/N.

A pump overfeed system may comprise an accumulator for the refrigerant in liquid phase. An evaporator pump is preferably provided for pumping liquid refrigerant to the evaporator. The controller may be configured to control the evaporator inlet valve to obtain the above mentioned vapor quality values.

BRIEF DESCRIPTION OF THE DRAWINGS

Embodiments of the invention will be described with reference to the drawings, in which

FIG. 3a, 3b, 3c, 3d show schematic representations of different types of evaporators;

DETAILED DESCRIPTION

Figure 1:
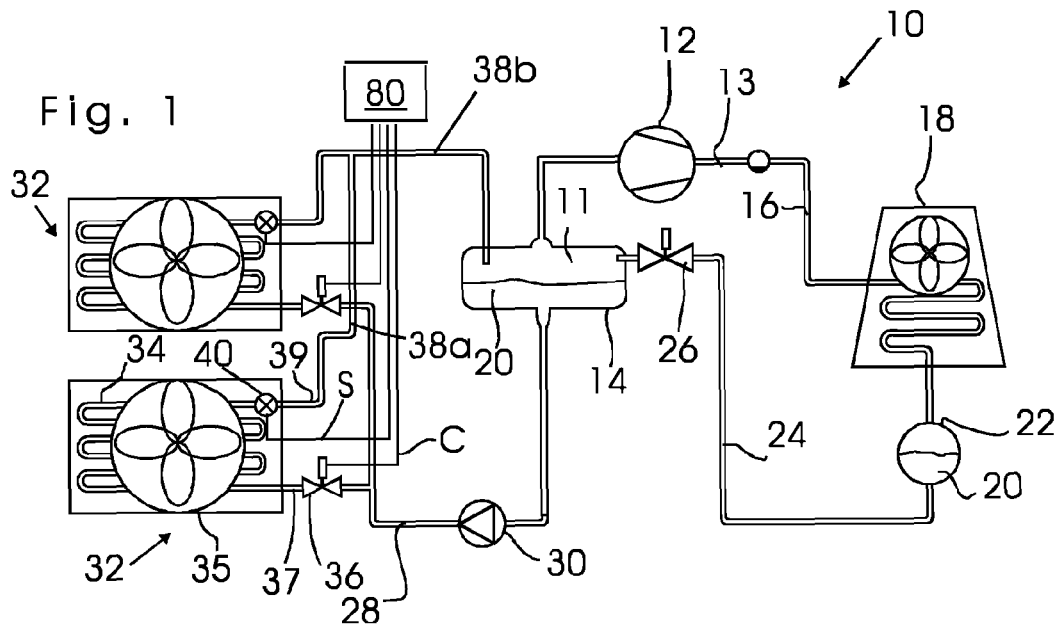
FIG. 1 shows a schematic representation of a pump over-feed cooling system.

FIG. 1 shows an embodiment of a cooling system 10.

The cooling system 10 is a pump over-feed cooling system operated with ammonia as refrigerant.

The cooling system 10 comprises a compressor 12 to compress ammonia gas (vapor) 11 contained in the upper portion of a receiver 14 filled with both gaseous ammonia 11 and liquid ammonia 20 to obtain compressed ammonia gas 13. The compressed ammonia gas 13 is supplied through a conduit 16 to a condenser 18, where it condenses at least partly to collect as liquid ammonia 20 in a collector 22. The liquid ammonia 20 is supplied through a conduit 24 to the receiver 14 through an expansion valve 26.

The liquid ammonia 20 from the lower part of the receiver is pumped by a pump 30 through a conduit 28 to evaporators 32.

In the example shown, the cooling system 10 comprises two identical evaporators 32 connected in parallel. The skilled person will recognize that different embodiments of the cooling system 10 may comprise a different number of evaporators 32, such as only one or more than two evaporators. In the following, only one of the evaporators 32 connected in parallel will be described.

The liquid ammonia 20 is supplied through a controllable evaporator inlet valve 36 to the evaporator 32. The evaporator 32 comprises a plurality of evaporator tubes 34 in thermal contact with an air flow 33 of a ventilator 35.

The evaporator 32 is preferably a flooded evaporator type with one common liquid inlet 37 and one common outlet 39. The evaporator 32 has at least one pass, i.e. one evaporator tube 34 passing from inlet 37 to outlet 39. Preferably, the evaporator 32 has multiple parallel passes, e.g. 6-8 parallel evaporator tubes 34 connected between the inlet 37 and outlet 39. Different evaporator types can be used e.g. as shown in FIG. 3a-3d.

FIG. 3a shows a bottom feed evaporator where the refrigerant is supplied through a lower feed line 37, distributed to flow along the evaporator tubes 34 in thermal contact with the air flow 33, collected and returned in an upper return line 39.

FIG. 3b shows a top feed evaporator in which the refrigerant is supplied through an upper feed line 37, distributed into the evaporator tubes 34, collected and returned in a lower return line 39.

FIG. 3c shows a side/bottom feed evaporator. The refrigerant is supplied through a lower feed line 37 at the evaporator front, distributed into the evaporator tubes 34, collected and returned in an upper return line 39.

In each case the air flow 33 is directed traverse to the refrigerant flow through the evaporator tubes 34. Through the thermal contact between the air flow 33 and the evaporator tubes 34, heat from the air flow 33 is transferred to the refrigerant flowing within the evaporator tubes 34, such that the refrigerant is evaporated.

The degree to which the ammonia medium flowing through the evaporator tubes 34 is evaporated may be expressed in terms of the vapor quality value X. The liquid ammonia supplied through the feed line 37 will have a vapor quality X of (or very close to) 0%. As the ammonia refrigerant flowing through the evaporator tubes 34 receives heat transferred from the air flow 33, more and more will evaporate such that the vapor quality will rise.

As the system 10 is a pump over-feed cooling system, the refrigerant will not be fully evaporated, i.e. the mass flow of refrigerant supplied through the feed line 37 will be more than the evaporator capacity $C_E$, such that the vapor quality X in the return line 39 will be below 100%.

Within the evaporator 32, the heat transfer from the air flow 33 to the individual parallel evaporator tubes 34 will differ. One of the parallel evaporator tubes 34, which is here designated as the first evaporator tube 34a, will carry the highest heat load, i.e. at the outlet of the first evaporator tube 34a before it enters the collecting conduit 31, the vapor quality X will be the highest of any of the evaporator tubes 34. In FIG. 3a, 3b, the first evaporator tube 34a is shown for the different types of evaporators.

For some evaporator types, such as in FIG. 3a, 3b, the evaporator tube 34a with the highest heat load may be easily determined by a skilled person by considering which evaporator tube has the closest thermal contact with the air flow.

Figure 3D:
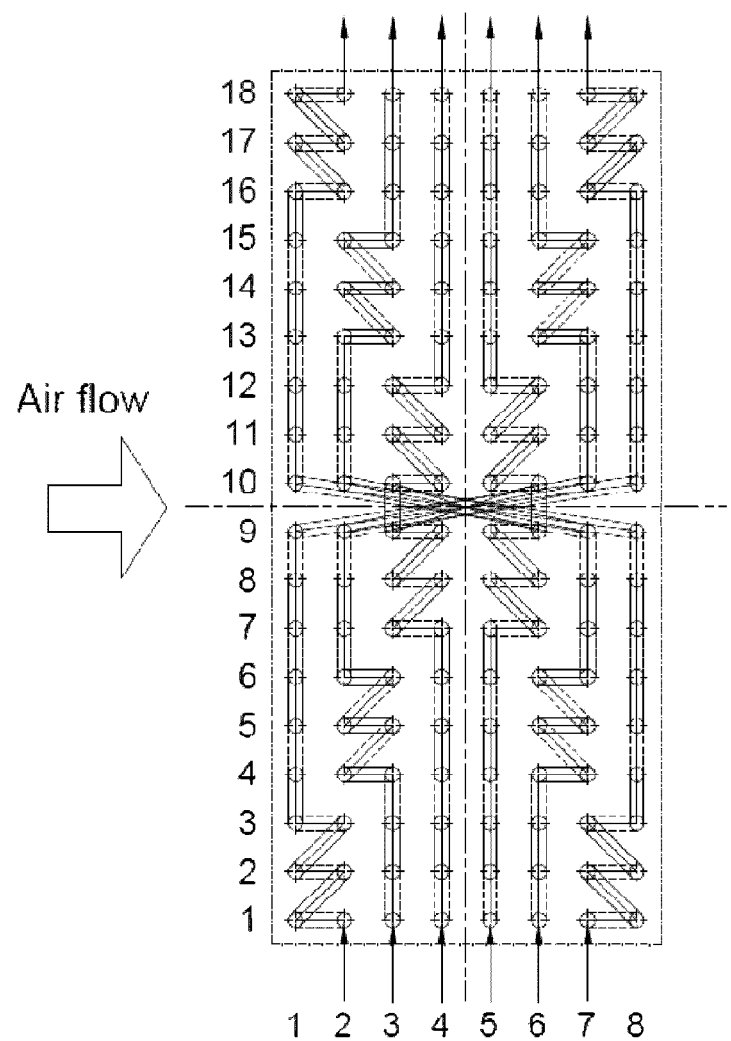
Figure 4:
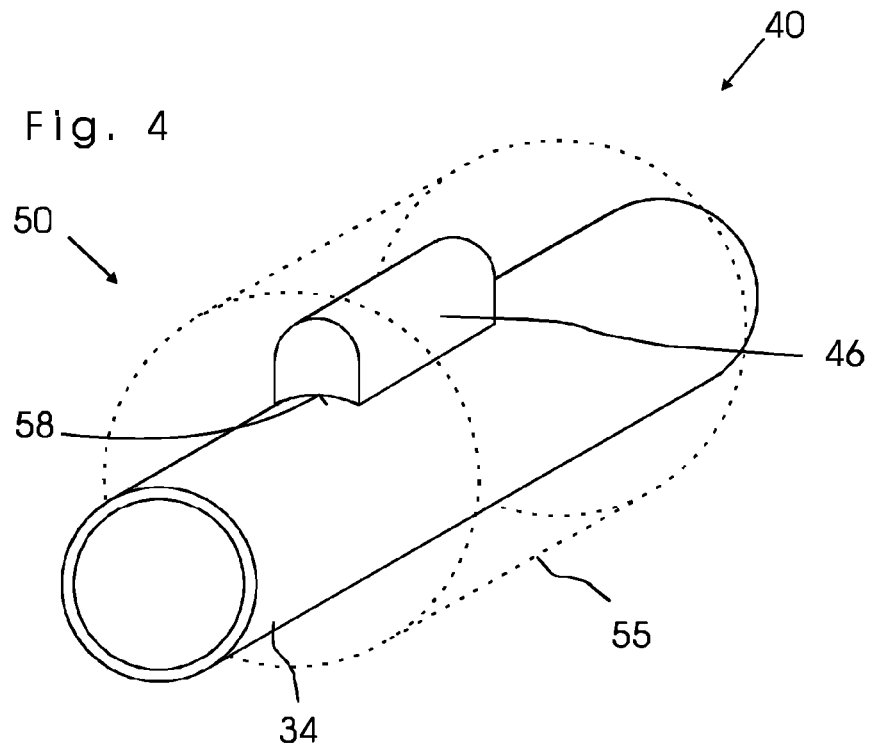
FIG. 4 shows a perspective view of a sensor arrangement in the cooling system of FIG. 1.
Figure 5:
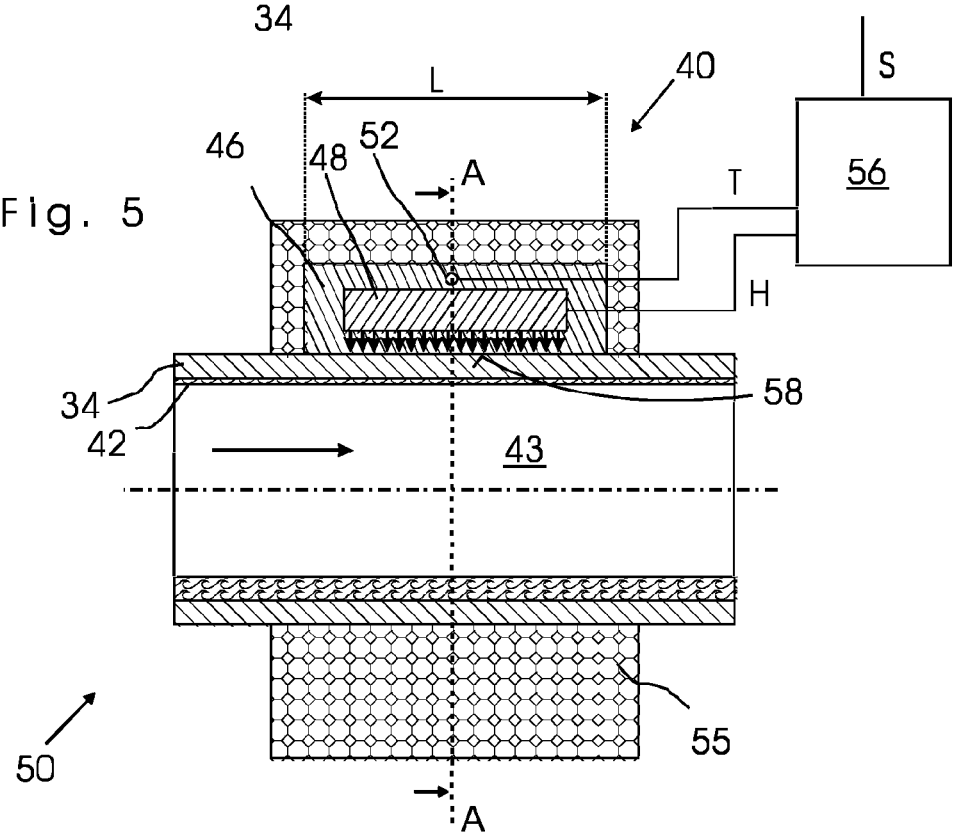
FIG. 5 shows a longitudinal sectional view of the sensor arrangement of FIG. 4.
Figure 6:
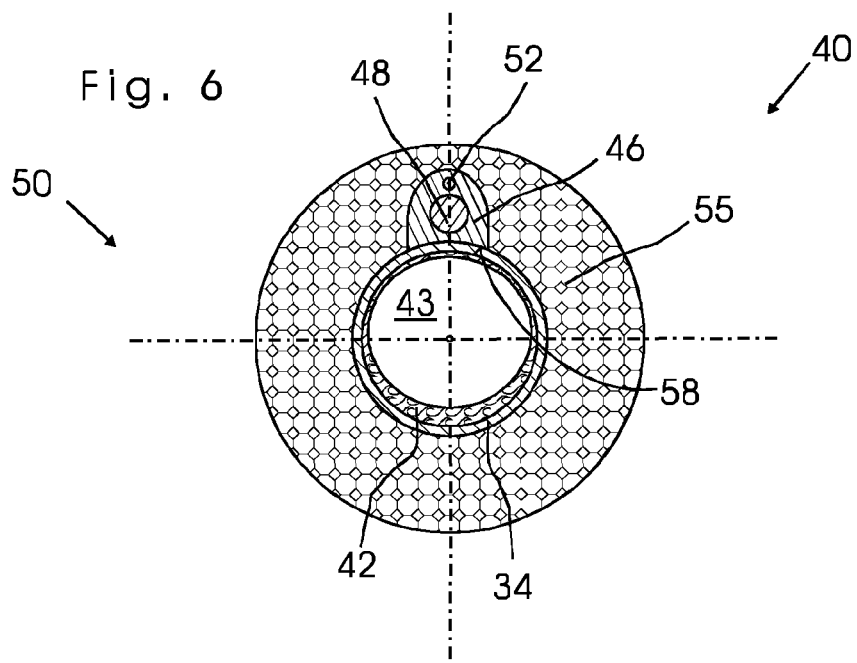
FIG. 6 shows a cross-sectional view of the sensor arrangement of FIG. 4,5 with the section along A . . . A in FIG. 4.
Figure 7:
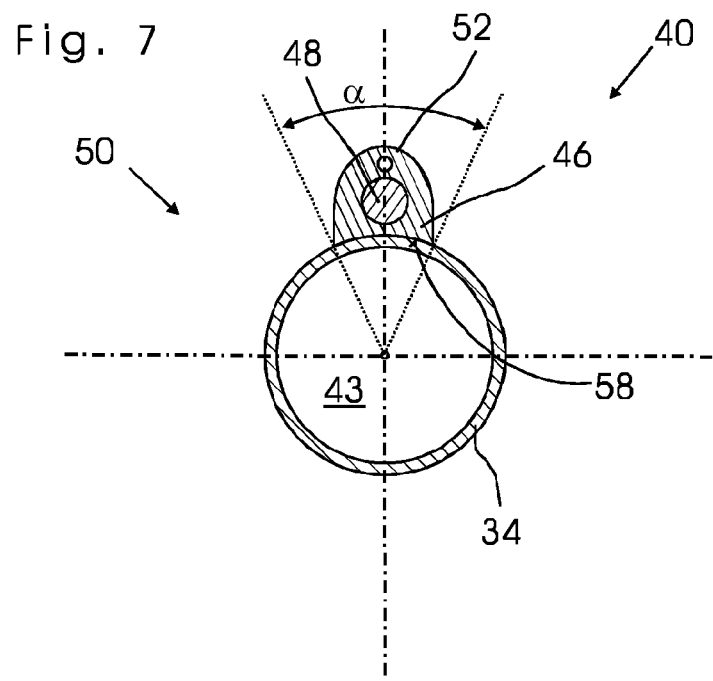
FIG. 7 shows a cross-sectional view of a part of the sensor arrangement of FIG. 4-6.

FIG. 3d shows a further evaporator design of a bottom feed evaporator with 6 distributions and 24 passes. In this design, it may be difficult to predict which pipe will have the highest load.

One possible approach to identifying the highest loaded pipe in an evaporator 32 may be experimental operation of the cooling system 10 while measuring and monitoring the vapor quality at the outlet of each pipe by using a vapor quality sensor 40. An example of a suitable procedure as well as possible embodiments of a sensor 40 used therein will be further described below.

Back in FIG. 1, the mixture of ammonia gas and liquid ammonia returned from the evaporator 32 through the return line 39 is guided through an individual first return conduit portion 38a and a common second return conduit portion 38b back into the receiver 14, where it separates into ammonia gas 11 in the upper portion of the receiver 14 and liquid ammonia 20 in the lower portion of the receiver 14.

For a cooling system 10 with multiple evaporators 32, each evaporator 32 comprises a separate evaporator inlet valve 36 branching off from the conduit 28 from the pump 30 and a separate first return conduit portion 38a for the partly evaporated ammonia. The first return conduit portions 38a from the evaporators 32 merge at the common second return conduit portion 38b.

For each of the evaporators 32, a vapor quality sensor 40 is provided at one of the evaporator tubes 34 to deliver a sensor signal S indicative of the vapor quality of the ammonia medium flowing through the evaporator tube 34.

For a medium flowing through a conduit such as the evaporator tube 34, the vapor quality X usually cannot be measured directly, as this would require a separation of gas and liquid to weigh the respective mass, which is not possible in a flowing medium. Moreover, the liquid phase portion and the vapor phase portion may distribute differently within the conduit and may travel at different velocities.

The vapor quality value X is generally different from a void fraction, i.e. the volume fraction of the flow-channel volume that is occupied by the gas phase. While the void fraction is determined by the relative volume, the vapor quality value X is the thermal dynamic vapor quality based on mass fraction.

Figure 2A:
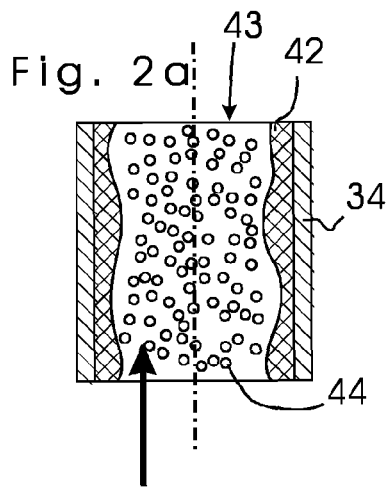
FIG. 2a shows a schematic representation of a longitudinal sectional view of the flow of a medium through a vertical portion of a conduit of the cooling system of FIG. 1.

Depending e.g. on the flow speed and on the vapor quality, the flow of mixed liquid/vapor ammonia through a conduit such as an evaporator tube 34 may follow different flow regimes. FIG. 2a schematically illustrates an annular flow in the interior 43 of a vertically arranged portion of a conduit 34. A liquid film 42 flows on the conduit wall and a two-phase flow 44 of ammonia liquid and vapor flows near the center. As the thickness of the fluid film 42 will be equally distributed in a vertically oriented conduit 34, it will appear as a circle in cross-section. An annular flow regime may e.g. be expected in a conduit 34 at a usual flow speed of 5-15 m/s.

Figure 2B:
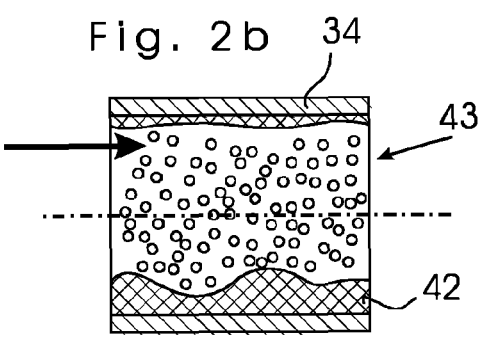
FIG. 2b, 2c show in schematic representation a longitudinal section and a cross-section of a flow of a medium through a horizontal portion of a conduit.
Figure 2C:
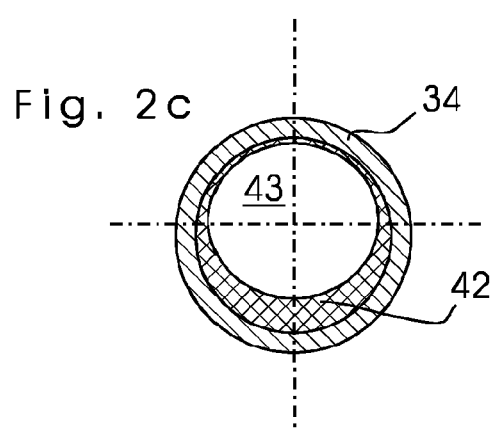

In a horizontally arranged portion of the conduit 34 as shown in FIG. 2b, 2c, the fluid film 42 will be thicker at the bottom and thinner at the top due to the influence of gravity.

The sensor 40 provides a sensor signal S which is indicative on the vapor quality value X. As will be described in detail, the sensor 40 derives the signal S based on temperature measurements in response to heat supplied to the conduit 34 and to the refrigerant medium flowing therein.

An embodiment of a sensor arrangement 50 including a sensor 40 attached to an evaporator pipe 34 is shown in FIG. 4-7.

The sensor 40 comprises a sensor body 46 with a heating element 48 and a temperature sensor 52 arranged in cavities within the sensor body 46. The sensor body 46 is clamped to the outer wall of the conduit 34.

The sensor body 46 is a solid piece of a metal material of good heat conduction such as copper. It is positioned on the outside of the conduit 34 in contact with an outer tube wall thereof. The sensor body 46 has a contact surface 58 in direct contact with the tube wall of the conduit 34. The sensor body 46 and the contact surface 58 extend over a length L in longitudinal direction of the conduit 34. The contact surface 58 has a concave shape to conform to the curved shape of the outer tube wall of the conduit 34.

The portion of the conduit 34 to which the sensor 40 is mounted is arranged horizontally. As shown in particular in FIG. 7, the sensor body 46 is arranged on top of the outer tube wall of the conduit 34. An installation angle measured between a line from the center of the conduit 34 to the center of the contact surface 58 and an upward vertical direction is 0°. The contact surface 58 in the embodiment extends over a contact angle α of about 50°. Therefore, in the example the sensor body 46 is in direct contact with the tube wall over an angular range of −25°-+25° to the vertical axis.

An insulation 55 is provided to surround the sensor body 46 and a portion of the conduit 34 to thermally insulate it. The heating element 48 arranged within a cavity of the sensor body 46 is an electric heating element, e.g. an electrical resistor of defined electrical resistance, connected to a driver circuit 56. The temperature sensor 52 is also an electrical temperature sensor such as e.g. a PT100 element, electrically connected to the driver circuit 56.

The driver circuit 56 operates the heating element 48 to deliver a defined power, constant over time. The heat from the heating element 48 distributes within the sensor body 46 and to the wall of the conduit 34. Due to the good heat conduction and high mass of the massive sensor body 46, the heating element 48, temperature sensor 52, and the adjoining portion of the wall of the conduit 34 are all thermally closely coupled so that they will assume a common temperature T with only minimal temperature gradient. Due to the insulation 55, the temperature T will be an equilibrium temperature dependent on the constant power H of the electrical heating and the rate of heat transferred to the refrigerant medium within the conduit 34.

In a preferred embodiment, the area of the contact surface 58 may be about 5 cm$^2$, and an electrical heating power may be 25 W, such that the specific power per cm$^2$ is 5 W/cm$^2$.

The transfer of heat from the wall of the conduit 34 to the refrigerant flowing within the conduit 34 is dependent on the phase of the refrigerant in contact with the wall. If the wall portion in contact with the contact surface 58 is wetted with liquid ammonia, the heat transfer is very high, and heat from the heating element 48 and conducted through the sensor body 46 and the wall of the conduit 34 is absorbed by the refrigerant at a high rate. If the inside of the wall is "dry", i.e. not in contact with a substantial amount of liquid ammonia, the rate of transfer of heat is significantly lower.

Under the constant supply of power H from the heating element 48, the wall of the conduit 34 and the sensor body 46 will assume different equilibrium temperatures T in response to different vapor quality values X.

Figure 8:
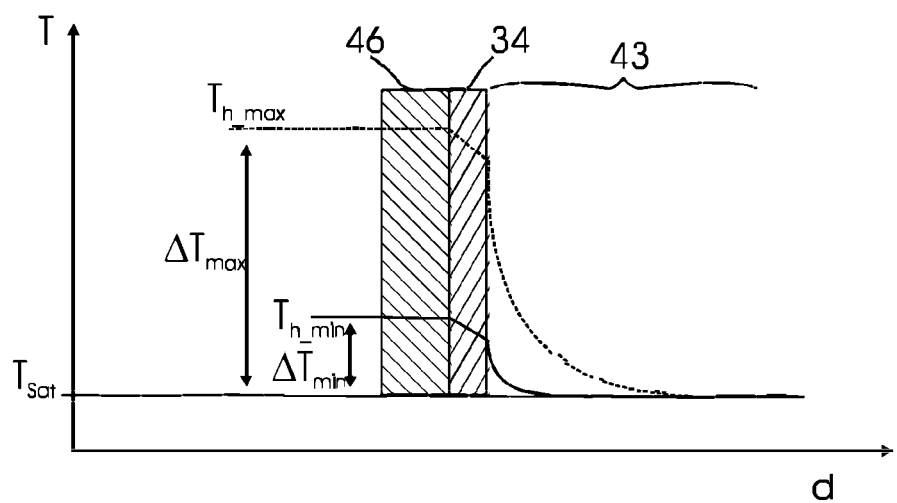
FIG. 8 shows a diagram of temperatures within the sensor and conduit of FIG. 4-6.

FIG. 8 schematically shows curves of the temperature T in the region of the interface between the sensor body 46, conduit wall 34, and interior 43 of the conduit 34. The diagram shows as $T_{Sat}$ the saturated temperature of the ammonia refrigerant in the interior 43 of the conduit 34.

In FIG. 8, the lower curve (solid line) shows the temperature curve for a case where a significant amount of liquid ammonia is present in the interior 43 of the conduit 34, and in particular in contact with the wall of the conduit 34 (e.g. for a vapor quality X of 30% or less). In the center of the interior 43, the ammonia is at the saturated temperature $T_{Sat}$. Due to the heating power supplied to the sensor body 46, a temperature gradient establishes between the sensor body 46 and the interior 43 of the conduit 34, leading to the curve shown. Following the curve from right to left in FIG. 8, the temperature T starts from $T_{Sat}$ and increases towards the wall of the conduit 34. Within the wall of the conduit 34, the temperature further increases. Within the sensor body 46, the higher temperature $T_{h\_min}$ is reached.

The upper curve (dashed line) in FIG. 8 shows the temperature curve if the interior 43 is filled only with gas at a vapor quality value X of 100%. As for the above described dotted line, the ammonia in the center of the interior 43 is at the saturated temperature $T_{Sat}$. Following the dashed curve from right to left, the temperature T increases towards the wall of the conduit 34 and further within the wall of the conduit 34 up to a temperature $T_{h\_max}$ of the sensor body 46. Due to the much lower heat conduction at the inner surface of the wall of the conduit 34, the temperature $T_{h\_max}$ of the sensor body 46 is much higher than in the case of liquid refrigerant.

The value considered indicative of the vapor quality is the temperature difference $\Delta T$ between the temperature of the sensor body 46 and the saturated temperature $T_{Sat}$. For low vapor quality (X<30%), the temperature difference is $T_{h\_min}$. For X=100%, the temperature difference is at a maximum $\Delta T_{max}$. For any vapor quality values in between, temperature differences $\Delta T$ will be between $\Delta T_{max}$ and $\Delta T_{max}$.

Thus, the temperature reading T from the temperature sensor 52 processed in the driver circuit 56 of the sensor 40 is indicative of the vapor quality. The sensor signal S is derived from the measured temperature value T by calculating the temperature difference $\Delta T$ to the saturated temperature $T_{Sat}$, which can be measured by measuring the refrigerant temperature, e.g. by a temperature sensor (not shown) extending through the wall into the interior of the conduit 34 or by a clamp-on temperature sensor. Alternatively, the saturated temperature may be calculated based on a pressure measurement.

The sensor signal S may be provided differently from the driver circuit 56, e.g. as a digital signal or as an analog electrical signal. In one preferred embodiment, the sensor signal S is a current signal, for example with a current in the range of 4-20 mA.

As explained above with reference to FIG. 2a-2c, the distribution of liquid and gaseous ammonia refrigerant within the conduit 34 is not homogenous. In particular for annular flow in a horizontally arranged portion of the conduit 34, there will be a distribution with more of the liquid portion of the refrigerant arranged at the bottom and less on top.

Figure 9:
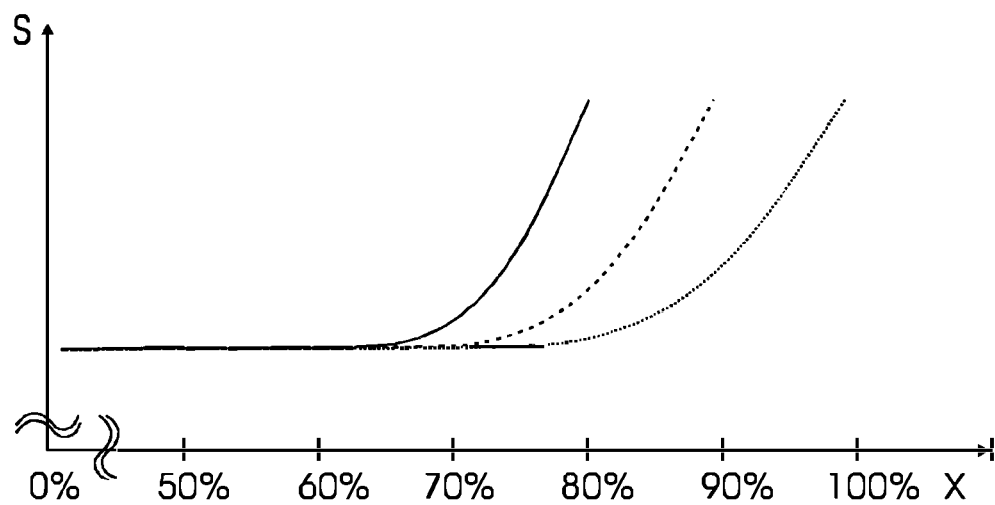
FIG. 9 shows a diagram of a dependency of a sensor signal on a vapor quality value for the sensor of FIG. 4-6.

The position of the sensor 40 has an important influence on the temperature reading T and derived sensor signal S obtained for different vapor quality values X. FIG. 9 shows curves of the sensor signal S dependent on the vapor quality X.

The solid line shows the sensor signal S of the sensor 40 arranged on top of the conduit 34 as shown in FIG. 4-7. Due to the interior of the wall of the conduit being in contact with liquid ammonia, the sensor signal for lower vapor quality values X up to about 65% remains constant. From about 65% on, the sensor signal S shows a strictly monotonous rise, such that the sensor signal S is indicative of the vapor quality value X.

Figure 11:
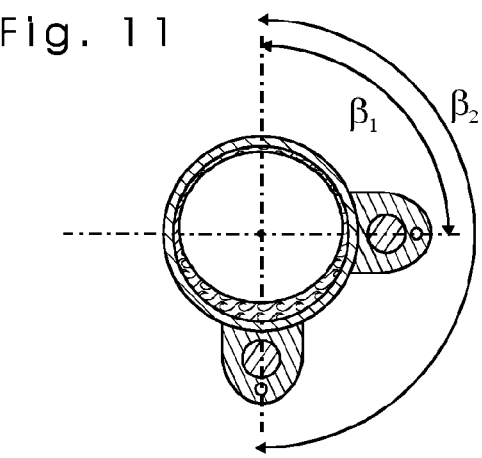
FIG. 11 shows alternative embodiments of sensor arrangements

For alternative arrangements of a sensor 40 on the conduit 34 as shown in FIG. 11 either to the side (under an angle β1 of 90° to the upward vertical direction) or below (under an angle β2 of 180° to the upward vertical direction), the curve of the sensor signal S in dependency on the vapor quality value X differs. In FIG. 9 the dashed line shows the sensor signal S for a sensor 40 arranged under an angle of β1=90° and a dotted line shows the sensor signal S for a sensor 40 arranged under an angle of β2=180°. The larger the angle of arrangement β is, the higher the threshold of the vapor quality value X required to obtain a rising sensor signal S. For the sensor arranged under an angle of β1=90° the sensor signal S does not rise until above X=70%, and for the sensor 40 arranged under an angle of δ2=180° the signal S rises only above X=80%.

The arrangement angle β may be chosen to obtain a desired sensitivity of the sensor arrangement 50, depending on the expected range of the vapor quality value X. As will be shown for some examples below, different sensor positions, such as top position (e.g. β=+/−30°, 10 o'clock up to 2 o'clock position of the sensor 40 in cross-section), horizontal position (β=45°-90°, 3 o'clock position) and bottom position (β>90°, 4 o'clock up to 8 o'clock position) of the sensor 40 in cross-section may be suitable for different evaporator types.

It should, however, be recognized that the sensor signal S is not necessarily an exact measurement of a specific vapor quality value X. While in an effective working range of the sensor 40 there is a strictly monotonous dependency of the sensor signal S on the vapor quality value X as shown in FIG. 9, the actual curve may also be dependent on other parameters, such as the distribution of liquid and gas within the conduit 34, the flow speed, the specific effect of the heating element 48. Thus, obtaining exact measurements of the vapor quality X from the sensor signal S may require additional information or assumptions, such as to the flow regime. Taking the additional information into account e.g. by calculations or by calibration, it is possible to obtain a value for the vapor quality X. However, as will be shown below, due to a monotonous dependency of the sensor signal S on the vapor quality X, even without such calibration the sensor signal S may nevertheless be used to observe operation and to effect control of the cooling system 10 based on the sensor signal S.

The sensor 40 may be arranged in different positions within the cooling system 10 of FIG. 1. In the most preferred embodiment, the sensor 40 is arranged at the evaporator tube 34a with the highest heat load (FIG. 3a-c). The sensor 40 is further preferably arranged at the end of the evaporator tube 34a (although preferably outside of the air flow 33), i.e. the outlet of the tube 34 before entering the collecting conduit 31.

At this position within the system 10 and evaporator 32, the vapor quality X will be the highest. Therefore, this position is well suited to obtain the sensor signal S. Alternatively, the sensor 40 may be arranged in a different position, or a plurality of sensors 40 may be arranged at different evaporator tubes 34. For evaporators 32 where the load distribution between each of the evaporator tubes 34 is known, the sensor 40 may alternatively be arranged e.g. on the evaporator tube 34 with the $2^{nd}$, $3^{rd}$, or $n^{th}$ highest heat load in order to obtain a different sensitivity. Also, it is possible to adjust the sensitivity by using a different mounting position of the sensor 40 as explained above with reference to FIG. 11. Experimental determination of the load distribution and/or of a preferred sensor location is described below.

In the pump overfeed ammonia cooling system 10 of FIG. 1, the sensor signals S from the vapor quality sensor 40 of each evaporator 32 are supplied to a controller 80. The controller 80 is a computer programmed to execute a control program to derive a control signal C from the sensor signal S. The control signal C is supplied to the control valve 36 of each evaporator 36 and controls the degree of opening of the control valves 36. The control valves 36 are for example solenoid valves controllable by control signals C.

The degree of opening of the control valves 36 determines the amount of liquid ammonia refrigerant supplied to each evaporator 32. A circulation rate N indicates the ratio of the mass flow of ammonia supplied to an evaporator 32 and the design/rated/nominal capacity of the evaporator.

In pump overfeed systems such as the cooling system 10 shown in FIG. 1, the circulation rate N is above 1, i.e. the mass flow of liquid ammonia to each evaporator 32 is higher than the capacity of the evaporator 32, such that the ammonia is only partly evaporated and the vapor quality X in the evaporator conduits 34 is below 100%. Generally, the vapor quality X in the outlet of the evaporator 32 will be the inverse of the circulation rate N, i.e. X=1/N.

The vapor quality value X will be highest in the evaporator tube 34a with the highest heat load, where the sensor 40 is arranged.

Figure 12:
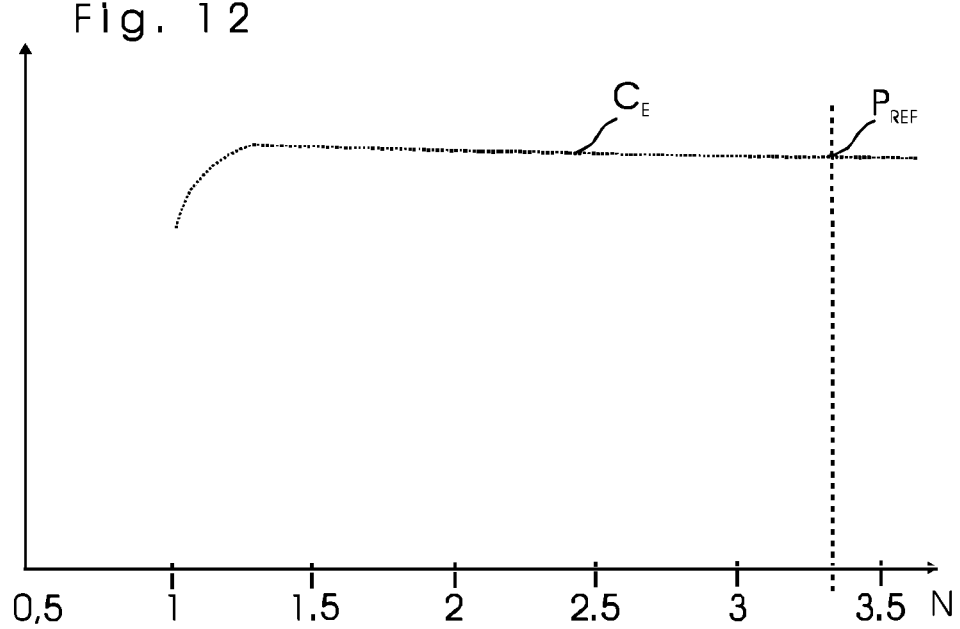
FIG. 12 shows a diagram of the dependency of the evaporator capacity on the circulating rate.

As shown in FIG. 12, the evaporator capacity $C_E$ is not constant, but dependent on the vapor quality X/circulation rate N. As more of the ammonia refrigerant is evaporated, less of the inner surface of the walls of the evaporator tubes 34 will be in contact with liquid ammonia. The heat transfer from "dry" tube walls to the refrigerant medium, however, is significantly less than the heat transfer from tube walls in contact with a liquid film 42 as shown e.g. in FIG. 2a-2c. Therefore, the evaporator capacity decreases for low circulation rates N, corresponding to high values of the vapor quality X.

FIG. 12 illustrates a typical dependency of evaporator capacity $C_E$ on circulation rate N. The performance data should preferable be data measured by the manufacturer of the evaporator, however this is not common information. On a constantly operating evaporator, it is possible to show the performance dependency of the circulation rate. If an evaporator has a known operating point, e.g. Ncirc=3,3, then the capacity dependency can be measured, by measuring the air temperature difference across the evaporator, and stepwise reducing the injected liquid ammonia into the evaporator. This method is only suitable if it is possible to operate the system under constant condition.

With information on evaporator capacity $C_E$ vs. circulation rate N, it is possible to select a suitable sensor location, taking into account an operation point with low circulation rate, but with a limiting reduction of the evaporator capacity.

Generally, pump overfeed systems such as the cooling system 10 of FIG. 1 are designed with a circulation rate of 3-4, i.e. the mass flow rate of liquid ammonia through the valves 36 is 3-4 times higher than the amount needed for the design/rated/nominal capacity of the evaporator 32 to compensate for load variations. However, this leads to systems with a high total amount of ammonia refrigerant. Due to safety concerns, it would be desirable to reduce the amount of ammonia within the system.

The amount of ammonia may be reduced if the flow rate N is reduced below the usual value of 3.

The cooling system 10 includes the controller 80 to control the mass flow of ammonia supplied to the evaporators 32, and thereby the flow rate N, aiming to obtain a flow rate of less than 3, however being able to react to load variations.

Control is effected based on the sensor signal S indicative of the vapor quality value X of the partly evaporated ammonia refrigerant in one of the evaporator tubes 34 (and preferably the most loaded evaporator tube 34a). The control objective is to minimize the liquid overfeed, in particular of flooded ammonia evaporators, with no or minimal reduction of the cooling capacity. In this way, the liquid hold-up in the evaporator and in the return conduits 34a, 34b may be reduced, so that the overall ammonia charge within the cooling system 10 is reduced.

Figure 10:
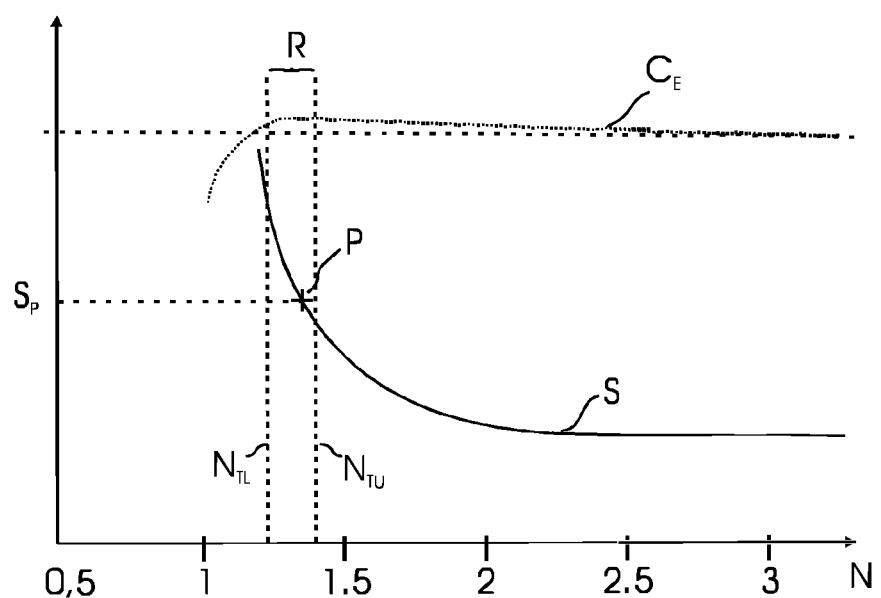
FIG. 10 shows a diagram of the dependency of a sensor signal and an evaporator capacity on a circulating rate.

FIG. 10 shows in an example how the evaporator capacity $C_E$ and the sensor signal S vary depending on the circulation rate N.

Above a certain value of the circulation rate N, which in the example is at about N=2, the evaporator capacity $C_E$ remains essentially constant. If the circulation rate N decreases below this value, the evaporator capacity $C_E$ actually increases slightly. At a lower threshold value $N_{TL}$, in the example at about $N_{TL}$=1.25, the evaporator capacity $C_E$ decreases.

Operating an un-regulated system within a control range R only slightly above the lower threshold value $N_{TL}$ may not leave sufficient capacity to cover for load variations. However, by using an active circulation rate control, the operating range may be extended into the control range R, while retaining the possibility to increase the mass flow in case of increased load.

Such active circulation rate control is effected by the controller 80 based on the sensor signal S.

The controller 80 regulates the mass flow rate of ammonia refrigerant to each of the evaporators 32 by controlling the control valves 36 based on the sensor signal S indicative of the vapor quality value X of the refrigerant at the outlet of the evaporator 32.

In a preferred control strategy, the evaporators 32 of the cooling system 10 may e.g. be operated at an operating point P indicated in FIG. 10 within the control range R ($N_{TL}$<N<$N_{TU}$).

For example, an operating point P may be chosen at a circulation rate N of about 1.3, so that the vapor quality value X at the operating point P will be at about 77%. During setup of the cooling system 10 and the controller 80, a reference sensor signal level $S_P$ may be obtained indicative of the operating point P.

For each of the evaporators 32 in the cooling system 10, the controller 80 will observe the sensor signal S delivered from each of the sensors 40. If the sensor signal S is above $S_P$, indicative of a higher vapor quality X than desired at the setpoint P, the controller 80 will adjust the control signal C to increase opening of the valve 36 to thereby increase the mass flow of refrigerant through the valve 36. If the sensor signal S is below $S_P$, indicative of a lower vapor quality X than desired at the setpoint P, the controller 80 will adjust the control signal C to reduce opening of the valve 36 to reduce the mass flow.

Thus, the controller 80 will continuously monitor the sensor signal S, which may be the temperature difference ΔT (or, alternatively, the temperature T so that the controller 80 may calculate ΔT by subtracting the reference temperature $T_{Sat}$). Based on the defined setpoint P and the sensor signal S compared to the setpoint sensor signal $S_P$, the controller 80 will reduce or increase mass flow into the evaporator 32.

The controller 80 may further incorporate an anti-windup for fast recovery after substantial load variations, i.e. after sudden high heat loads when the setpoint P cannot be achieved, e.g. if the evaporator 32 "overheats" or if insufficient liquid refrigerant is available. In such cases indicated by a high sensor signal S, the control 80 may be disposed to abandon closed-loop control and supply a control signal C to fully open the evaporator inlet vale 36. After the sensor signal S returns to the usual range, the controller 80 may resume closed-loop control.

In case of a reduced capacity of the evaporator 32, e.g. when the surface of the evaporator 32 is covered with ice, the controller 80 will detect a reduced sensor signal S and react by controlling the evaporator inlet valve 36 to reduce the mass flow of refrigerant.

Figure 13:
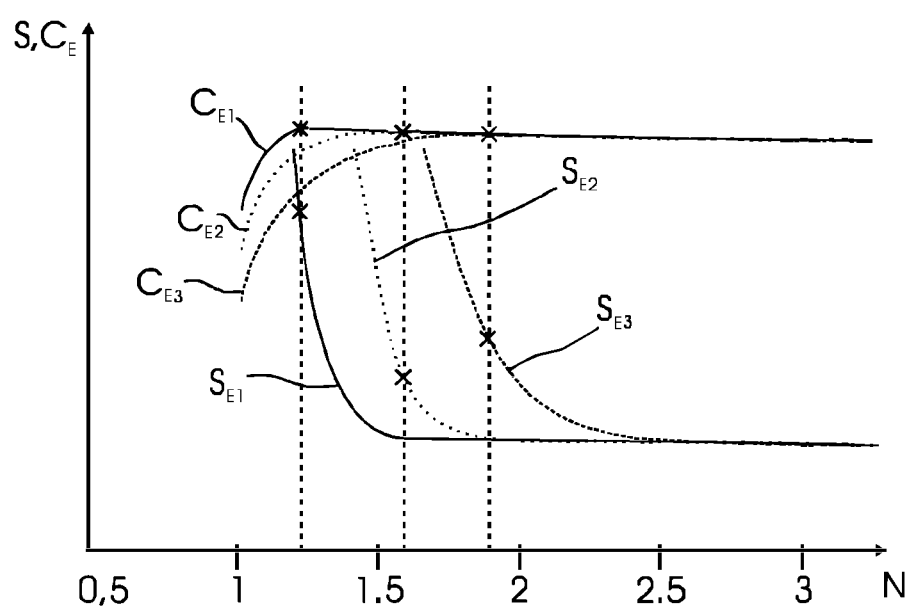
FIG. 13 shows a diagram of the dependency of sensor signals and evaporator capacities of different evaporator types on a circulating rate.

The dependency of the evaporator capacity on the circulation rate may vary for different types of evaporators. In FIG. 13, the examples of curves of the evaporator capacity $C_{E1}$, $C_{E2}$, and $C_{E1}$, of three different evaporator designs and the corresponding sensor signals $S_{E1}$, $S_{E2}$, and $S_{E1}$ for three different arrangement angles are shown.

The first evaporator design to which the evaporator capacity curve $C_{E1}$ belongs may e.g. be a special design which is able to operate with a very low circulating rate N.

In an evaporator of this evaporator design, the sensor signal $S_{E1}$ is preferably obtained from a heated sensor 40 as described above, installed at the top of the evaporator tube ($\beta=0$, 12 o'clock position).

Further shown in FIG. 13 is a capacity curve $C_{E2}$ for a second type of evaporator design, which leads to a different dependency of $C_{E2}$ on the circulation rate N.

In a cooling system with an evaporator according to this second evaporator design, the sensor signal $S_{E2}$ is preferably obtained from a heated sensor 40 as described above, installed in horizontal position on the side of the evaporator tube ($\beta \approx 45$-$90°$, 2 o'clock up to 3 o'clock position).

Finally, FIG. 13 shows the evaporator capacity curve $C_{E3}$ for a third type of evaporator design, which is a standard type of evaporator which has been widely used in many installed cooling systems. In a cooling system with an evaporator according to the third evaporator design, the sensor signal $S_{E3}$ is preferably obtained from a heated sensor 40 installed at the lower part of the evaporator tube ($\beta>90°$, 4 o'clock to 8 o'clock positions).

If the load distribution of the evaporator tubes 34 is not known, e.g. not specified by the manufacturer, an experimental procedure may be conducted to determine the load distribution, and in particular to determine a preferred sensor location, which generally may be on the evaporator tube 34 with the highest heat load. This particular tube 34 among several evaporator tubes 34 may be both defined and determined by the procedure described below.

It may be assumed that the flow in a tube 34 on which a sensor 40 is located has an annular flow regime, however the distribution of gas/vapor and liquid is affected by several parameters, namely Pipe diameter (common diameters may e.g. be in a range from 10 to 25 mm. A small diameter may lead to a smaller difference of the flow distribution between top and bottom)

Heat transfer (common tube materials are e.g. Aluminum, stainless steel, and steel. The heat transfer rate may vary for different materials)

Internal surface roughness (A high roughness provides an improved heat transfer)

Distribution of velocity (the refrigerant may flow with different flow velocity in different portions of the pipe 34, e.g. there may be an increasing difference in flow velocity from top to bottom, e.g. in a range of 5-15 m/s).

The sensor 40 may be located e.g. at the outlet of any of several parallel passes (evaporator pipes 34). The placement generally considered here to be optimal for installing the sensor 40 is the pipe circuit that at reduced circulation first reaches a vapor quality $X \geq 100\%$, ("highest loaded pipe 34").

Procedure for determining the preferred position of the sensor 40:

A. The cooling system 10 is operated a at a stable operating point. During operation, the evaporator inlet valve 36 is gradually closed while the temperature on the evaporator tubes 34 near the outlet of all parallel passes are observed.

B. The pass that first reaches a vapor quality of $X \geq 100\%$, is selected to be the location of the sensor 40. The sensor is preferably arranged on the corresponding evaporator tube 34 oriented in top position ($\beta=0$)

C. The control system for the evaporator 32 is then installed, and the regulated liquid feed implemented as described above.

D. During full load operation the sensitivity of the sensor vs. the response of the system 10 can be verified. If the gas quality at high load results in a too high sensitivity (as defined by the controller) the sensitivity can be reduced by increasing the sensor position $\beta$.

For evaporators 32 of the same type and under identical operation conditions, the information obtained in the experiment described in steps a and b for one evaporator 32 can be used to determine the preferred sensor position for all other evaporators 32 of identical type.

It should be kept in mind that the above embodiments are merely examples of the cooling systems, sensor arrangements, operating methods, and sensing methods according to the invention. The invention is not limited to the disclosed embodiments.

For example, the control strategy and parameters, in particular the specific values of the control range R are given as examples only. The sensor design may differ, and the sensor may e.g. be applied in a different position within the cooling system or within the evaporator. The skilled person will recognize further possible modifications to the disclosed embodiments.

What is claimed is:

1. A sensor arrangement for providing a sensor signal indicative of a vapor quality of a medium flowing within a conduit, comprising a horizontally arranged portion of said conduit extending axially, a sensor arranged in thermal contact with a wall of said portion of said conduit, said sensor comprising a heating element and a temperature sensing element, and processing means disposed to deliver the sensor signal based on an output of said temperature sensing element, wherein said sensor comprises a sensor body made of a metal material, said heating element and said temperature sensing element being arranged in thermal contact with said sensor body, wherein said heating element is surrounded by said sensor body such that, along a radial plane, a part of said sensor body is arranged between said heating element and said horizontally arranged portion of said conduit; and wherein said temperature sensing element is surrounded by said sensor body such that, along a radial plane, a part of said sensor body is arranged between said temperature sensing element and said horizontally arranged portion of said conduit.

2. The sensor arrangement according to claim 1, wherein said heating element and/or said temperature sensing element are arranged in a cavity formed within said sensor body.

3. The sensor arrangement according to claim 1, wherein said sensor comprises a concave portion, an outer wall of said conduit being at least partially received within said concave portion.

4. The sensor arrangement according to claim 1, wherein an insulation is provided to insulate said sensor and at least a portion of said conduit.

5. The sensor arrangement according to claim 1, wherein said sensor is arranged on a wall of said conduit in a position forming an angle (β) of less than 30° to a vertical upward direction.

6. The sensor arrangement according to claim 1, wherein said heating element is disposed to deliver a constant amount of heat.

7. The sensor arrangement according to claim 1, wherein said heating element is disposed to deliver an amount of heat such that a value of delivered heat divided by a contact area between the sensor and the wall of the conduit is less than or equal to 0.2 W/mm2.

8. The sensor arrangement according to claim 1, wherein said heating element is radially arranged between said temperature sensing element and said portion of said conduit along a radial plane.

9. The sensor arrangement according to claim 1, wherein said heating element is thermally coupled to said horizontally arranged portion of said conduit through said part of said sensor body arranged between said heating element and said horizontally arranged portion of said conduit and/or said temperature sensing element is thermally coupled to said horizontally arranged portion of said conduit through said part of said sensor body arranged between said temperature sensing element and said horizontally arranged portion of said conduit.

10. The sensor arrangement according to claim 2, wherein said sensor comprises a concave portion, an outer wall of said conduit being at least partially received within said concave portion.

11. The sensor arrangement according to claim 2, wherein an insulation is provided to insulate said sensor and at least a portion of said conduit.

12. The sensor arrangement according to claim 3, wherein an insulation is provided to insulate said sensor and at least a portion of said conduit.

13. The sensor arrangement according to claim 2, wherein said sensor is arranged on a wall of said conduit in a position forming an angle (β) of less than 30° to a vertical upward direction.

14. A cooling system, comprising
the sensor arrangement according to claim 1,
at least one evaporator for evaporating an ammonia refrigerant, at least one compressor arranged to compress said ammonia refrigerant, at least one condenser for condensing said ammonia refrigerant, and at least one evaporator pump for pumping said ammonia refrigerant to said evaporator,
wherein the sensor arrangement is arranged at the conduit conducting said ammonia refrigerant from at least a portion of said evaporator.

15. The cooling system according to claim 14, further comprising
a controllable evaporator inlet valve connected to an inlet of said evaporator, and
a controller disposed to control said evaporator inlet valve depending on said sensor signal.

16. The cooling system according to claim 15, wherein said controller is configured to reduce an opening of said evaporator inlet valve in response to the sensor signal indicative of a low vapor quality value, and to increase opening of said evaporator inlet valve in response to the sensor signal indicative of a high vapor quality value.

17. The cooling system according to claim 14, wherein said evaporator comprises a plurality of pipes having a first portion exposed to an air flow and a second portion located outside of said air flow,
said sensor being arranged on said second portion of one of said plurality of pipes, and
said one of said plurality of pipes being said conduit.

18. The cooling system according to claim 17, wherein said one of said plurality of pipes of said evaporator is arranged to have the highest thermal load.

19. A method of sensing a vapor quality of a medium flowing within a conduit, comprising
providing a sensor in thermal contact with a wall of a horizontal portion of a conduit,
operating a heating element in said sensor to generate heat,
sensing a temperature of said sensor, and delivering a sensor signal indicative of a vapor quality based on said sensed temperature,
wherein said sensor comprises a sensor body made of a metal material, said heating element and said temperature sensing element being arranged in thermal contact with said sensor body,
wherein said heating element is surrounded by said sensor body such that, along a radial plane, a part of said sensor body is arranged between said heating element and said horizontally arranged portion of said conduit; and
wherein said temperature sensing element is surrounded by said sensor body such that, along a radial plane, a part of said sensor body is arranged between said temperature sensing element and said horizontally arranged portion of said conduit.

20. The method according to claim 19, wherein
said sensor is arranged on one evaporator pipe of a plurality of evaporator pipes of an evaporator in a cooling system, and
wherein said one evaporator pipe on which said sensor is arranged is the evaporator pipe which first reaches a vapor quality value of X≥100% if in operation of said cooling system starting from an operating point at which the vapor quality of all evaporator pipes of the evaporator is below 100% as a mass flow to said evaporator is reduced.

* * * * *